Aug. 23, 1960 J. J. KLINIKOWSKI 2,950,468
DATA SHIFTING CIRCUIT
Filed July 21, 1959
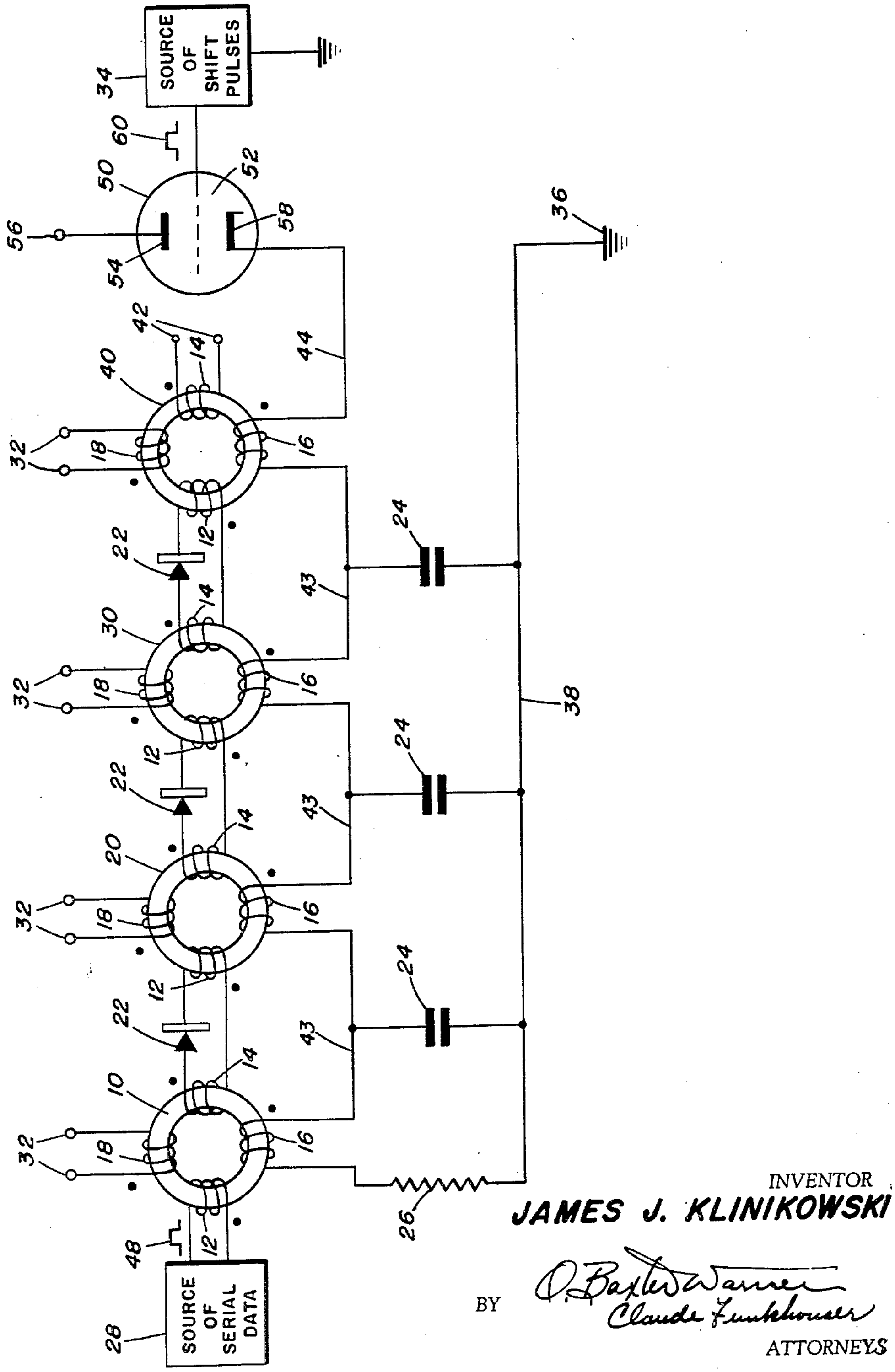
INVENTOR
JAMES J. KLINIKOWSKI
BY O. Baxter Warner
Claude Funkhouser
ATTORNEYS United States Patent Office 2,950,468

Patented Aug. 23, 1960

2,950,468

DATA SHIFTING CIRCUIT

James J. Klinikowski, Maple Shade, N.J., assignor, by mesne assignments, to the United States of America as represented by the Secretary of the Navy Filed July 21, 1959, Ser. No. 828,673

4 Claims. (Cl. 340—174)

This invention relates to a data shifting circuit for magnetic core digital storage devices and more particularly to a circuit employing shift windings on magnetic cores as elements of a transmission delay line for delivering shift signals successively to the cores.

Digital storage devices of the shift register variety are utilized in computing circuitry to store serially received pulse information in a cascaded core arrangement, each successive core storing a successive bit of information. As new information is received at the input end of the cascaded core register, it is necessary to step the information in the register from one core to the next toward its output end.

It is customary to provide a source of shift pulses energizing serially connected shift windings or advance windings on each of the cores of the register; when a shift pulse is generated, the information in each of the cores is stepped to the next succeeding core. It is also customary to employ a temporary delay circuit between the output of a given core and an input of a next core to store information from the given core until the next core has been cleared of information. Such temporary storage circuitry often involves intermediate capacitance inductance and resistance between the cores of the register. This intermediate circuit is not only space consuming but requires core outputs large enough to charge the intermediate storage condenser so that it may in turn energize the input winding of the next core.

This invention in general provides a delayed arrangement for shifting information for each of the cores in a shift register without the use of delay elements between successive output and input windings in this information channel. In the circuit of the invention a shift pulse is applied first to the last core of the register thus clearing such core of information, and then after a delay to the next succeeding core, etc. In this way each core is cleared of information before the previous core's information is shifted in. The result is achieved according to the invention by employing the shift windings of the cores as serial elements of a delay line and having shunt elements outboard to the shift register. The shift winding of the last core in the shift register ordinarily comprises the first element of the delay line while the shift winding of the first or input core of the shift register comprises the concluding element of the delay line; in this manner a shift pulse introduced at the beginning of the delay line travels along the shift register in a direction which is the reverse of information flow, successively providing a shift pulse for each of the cores of the shift register. Each core of the shift register is thereby cleared of information before information from a prior core is shifted into it.

It is accordingly an object of this invention to provide an improved shift register composed of magnetic cores with no necessity of delay elements in the information channel between cores.

It is another object of this invention to provide a more compact magnetic shift register.

It is another object of this invention to reduce the number of shift register circuit elements that data must pass through, and hence reduce attenuation in such a shift register or alternatively allow the use of smaller cores and core windings.

It is another object of this invention to provide an improved delay line employing as serial elements thereof windings on magnetic cores having a high degree of magnetic remnance.

It is a further object of this invention to successively interrogate successive cores on a magnetic shift register and shift such information into the next cascaded cores without the necessity of a multiple shift pulse generator.

Other objects and many of the attendant advantages of this invention will be readily appreciated as the same becomes better understood by reference to the following detailed description when considered in connection with the accompanying drawing showing by way of example a preferred embodiment of the invention.

Referring to the figure, a magnetic shift register, composed of torroidal magnetic cores 10, 20, 30 and 40, connected in cascade, is fed from a source of serial data 28, and provides a serial output at terminals 42. Each of the cores is constructed of a material having a substantially rectangular hysteresis loop, that is having two remnant conditions of substantial flux saturation, such materials being well known in the art. Each of the cores 10, 20, 30 and 40 has wound thereon an input winding 12, a serial output winding 14, a parallel output winding 18, and a shift or advance winding 16.

Each of these windings as shown on the drawing has a dotted end and a nondotted end, after the convention of polarities presently employed for transformers and magnetic core devices. A positive pulse input to the dotted end of a winding will produce a positive pulse output at the dotted ends of the other windings on the core providing the core is not already in a positive state of flux saturation. If the core is already in a positive state of flux saturation no output will be produced. Likewise, a negative input pulse at the dotted end of any one of the windings will produce a negative output pulse at the dotted end of any one of the other windings providing the intermediate core is not already in a negative state of flux saturation. If the core is in a negative state of flux saturation no output will be produced. Introducing a positive pulse at the nondotted end of a winding is equivalent to introducing a negative pulse at the dotted end and vice versa. Therefore, considering core 10 and the windings thereon, a positive pulse 48 from the source of data 28 introduced to the nondotted end of winding 12 will cause core 10 to saturate in a negative direction. There will be produced thereby a negative output from winding 14 but diode 22 connected between the dotted end of winding 14 on core 10 and the nondotted end of winding 12 on core 20, will prevent the transfer of information to core 20 at this time. However, when the next periodic shift pulse is received at winding 16 of core 10, such pulse being of a positive polarity at the dotted end of the winding, a positive output pulse will result from output winding 14 which will transfer through diode 22 to core 20 causing negative flux saturation of core 20. If no new information is introduced into core 10 from source 28 at the next serial time for such information, core 10 will remain in a state of positive flux saturation and the next succeeding shift pulse introduced at winding 16 will produce no output at winding 14 on account of such saturation. The successive operation of cores 20, 30 and 40 is identical to that described in connection with core 10. Occurrence of shift pulses and allotted times for information inputs from source 28 alternate in time. Outputs from cores 10, 20, 30 and 40 can be taken in parallel fashion from terminals 32 of the respective cores as desired.

According to the present invention the shift windings 16 of successive cores 10, 20, 30 and 40 are serially interrelated by means of connections 43 between successive cores. Windings 16 of the cores together with connections 43 comprise one side of a delay line or transmission line and conductor 38 is employed as the opposite polarity conductor of the delay line, such conductor being here grounded by means of connection 36. Capacitors 24 coupled between connections 43 and conductor 38 form shunt elements of the delay line. Input for the delay line is provided by a source of shift pulses 34 energizing grid 52 of cathode follower tube 50. Anode 54 of tube 50 is connected to an appropriate source of operating voltage by means of terminal 56. Cathode 58 provides the low impedance input to the shift winding 16 of the last core of the shift register through connection 44. Generation of a positive pulse 60 by source 34 produces a traveling pulse from right to left along the delay line which successively energizes the shift windings 16 of cores 40, 30, 20 and 10 in that order, that is in reverse order to the flow of stored information. The delay line is preferably terminated by a resistance 26 having a value equal to the characteristic impedance of the delay line.

Since the shift pulse travels along the shift register in reverse direction to that which bits of information from various cores take as they are shifted along the register, a given core is cleared of information by a shift pulse before new information is shifted into it from the previous core in the information chain, thus preventing interference between cores. It is not necessary to have intermediate delay elements between the winding 14 of a given core and winding 12 of the next core. This makes for a more compact shift register. Delay elements are removed from the critical information path of the register and placed in a control circuit which may be more readily supplied with requisite operating power.

Although only four cores are shown in the figure and only three shunt delay line elements, the invention is not thus limited and can be applied to shift registers of any desired size. Likewise, other delaying elements may be provided between the shift windings or between the input of the delay line and the shift winding on the last core of the shift register.

Obviously many other modifications and variations of the present invention are possible in the light of the above teachings. It is therefore to be understood that within the scope of the appended claims the invention may be practiced otherwise than as specifically described.

What is claimed is:

1. In a shifting register which includes a plurality of magnetic cores of high magnetic remnance adapted to shift bits of information from one core to the next, and including an input winding on each core, an output winding on each core for driving the input winding on the next core, and a shift winding on each core, the combination with said register of an electronic delay line employing said shift windings as elements thereof comprising, serial connections between shift windings on adjacent cores, and capacitors forming shunt elements of said delay line between said connections and the remaining side of said delay line.

2. The combination of claim 1 wherein said delay line is shunted at the input end of the shifting register by an impedance equal in value to the characteristic impedance of said delay line and energized by shift pulses at the output end of the shifting register.

3. The apparatus of claim 1 having diodes connected between the output winding of each core and the input winding of the next core, said diodes being poled to pass current in a direction from each core to the next to magnetize said next core as said shift windings are energized.

4. A shift register comprising a plurality of high remnance magnetic cores each having at least an input winding, an output winding, and a shift winding, arranged in a cascaded array from an input core to an output core and wherein the output winding on a core drives the input winding on the next core, a unilateral impedance coupling between said last two mentioned windings to permit power flow from said output winding to said input winding on the next core as said shift winding is pulsed, serial connections between shift windings on adjacent cores to form one side of a delay line, a conductor forming another side of the delay line, capacitors connected from said connections to said conductor, and a source of shift pulses feeding said delay line from the output end of the shift register so that the shift pulses will be delayed along the register in a backward direction whereby bits of information will be shifted along the register in a forward direction starting with the output core and proceeding along the line to the input core.

References Cited in the file of this patent

UNITED STATES PATENTS 2,800,596 Bolie _______________ July 23, 1957